June 28, 1932. S. Z. DE FERRANTI 1,864,586
INDUCTION ELECTRICITY METER
Filed Sept. 14, 1925 7 Sheets-Sheet 1

INVENTOR
S. Z. De Ferranti
By Marks & Clerk
attys.

June 28, 1932.    S. Z. DE FERRANTI    1,864,586
INDUCTION ELECTRICITY METER
Filed Sept. 14, 1925    7 Sheets-Sheet 5

INVENTOR
S. Z. De Ferranti
By Marks & Clerk
attys

June 28, 1932.  S. Z. DE FERRANTI  1,864,586
INDUCTION ELECTRICITY METER
Filed Sept. 14, 1925  7 Sheets-Sheet 6

INVENTOR
S. Z. De Ferranti
By Marks & Clerk
attys

Patented June 28, 1932

1,864,586

UNITED STATES PATENT OFFICE

SEBASTIAN ZIANI DE FERRANTI, OF HOLLINWOOD, ENGLAND, ASSIGNOR TO FERRANTI LIMITED, OF HOLLINWOOD, ENGLAND

INDUCTION ELECTRICITY METER

Application filed September 14, 1925, Serial No. 56,318, and in Great Britain October 9, 1924.

This invention relates to alternating current induction watt hour meters of the type wherein quadrature is obtained by self-induction and magnetic leakage in the shunt system and braking is provided by permanent magnets.

In such meters it is most desirable in order to have ample margin of power for overcoming friction, etc. to employ high driving and braking torques. This, however, results in correspondingly large lateral forces being applied to the rotor spindle bearings which leads to wear and tear of pivots and bearings.

The main object of the present invention is to eliminate this disadvantage.

The invention consists broadly in an induction electricity meter wherein under all conditions of load both driving and braking torques applied to the rotor or rotors are practically balanced so that there is substantially no unbalanced force applied to the spindle.

The improvement achieved by thus balancing the torques may be enhanced by relieving the force exerted by gravity upon the bearings due to the weight of the rotating element (rotor or rotors) and the present invention further consists in an induction electricity meter embodying a practically balanced moving element and incorporating means for supporting a part of or the whole of the weight of the moving element.

A further advantage accruing from thus relieving the weight of the rotating element is that a copper rotor may be substituted without detriment for the aluminium rotor which is usually employed on account of its light weight. This use of copper to constitute the rotor or rotors of the rotating element enhances both driving and braking torques owing to its superior electrical conductivity in comparison with that of aluminium.

The invention also consists in an induction electricity meter as indicated above embodying also one or more of the following features:—

(1) A plurality of driving systems in each of which both shunt and series fluxes only once intersect the rotor;

(2) Two separate driving systems arranged on opposite sides of the centre of a rotor and two separate braking systems arranged on opposite sides of the centre and midway between the driving systems;

(3) The various component parts are assembled as units which can be dismantled and re-erected individually without disturbing other units;

(4) A rotary element and buoyancy chamber mounted in a removable frame so that they are withdrawn as a unit;

(5) The support of part of or of the whole of the weight of the moving element is effected by submerging in mercury a buoyancy member associated with said element;

(6) Arranging the sealing device of the buoyancy chamber so that the rotor is held thereby for transport purposes;

(7) The support of part of or of the whole of the weight of the moving element is effected magnetically;

(8) A single energizing shunt magnet with a plurality of symmetrically disposed pole pieces is employed preferably embodying leakage flux air gaps of large area of cross section;

(9) A removable preferably transparent cover adapted to seat upon a bed formed on a substantially horizontally disposed supporting plate thus facilitating access to all sides of the meter mechanism;

(10) The rotor is formed as a cylindrical bell which operates in a vertical air gap thus enabling removal of the rotor from above without disturbing either braking or driving magnets;

(11) Mechanism serving to lock or release the rotor and to effect sealing of the mercury chamber (if desired) is disposed within the shunt magnet bobbin;

(12) The braking magnets are pivoted to swing out of operative position when removal of the rotor is desired;

(13) Additional (shaded pole) torque-producing means are provided for compensating the variation in the braking effect resulting from the series field at various loads.

The invention also consists in induction electricity meters, substantially as hereinafter described.

Referring to the accompanying diagrammatic drawings:—

In carrying the invention into effect in one form illustrated by way of example in Figures 1 to 7 as applied to a single-phase meter, I provide a shunt magnet core 1 having a T-shaped centre limb of rectangular section (shown with chamfered corners in Figure 1) and having two depending tapering pieces 2 and 2$^a$ at the extremities of the cross piece. The two outer limbs 3, 3$^a$ of the core are connected by a yoke 4 to which the base of the T-shaped core 1 is attached and are bent to form the upper pair of two pairs of pole pieces 5 and 5$^a$ which terminate above and adjacent the extremities of the cross piece which constitute the lower pair. The depending tapering pieces 2 and 2$^a$ lie close to the outer limbs 3 and 3$^a$ being separated therefrom only by an air gap of large area of cross section across which leakage shunt flux passes.

Figure 1:
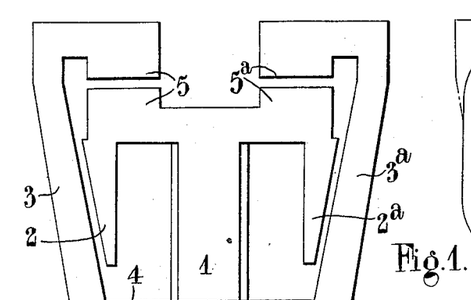
Figures 1 and 2 are elevational and plan views respectively of a convenient construction of shunt magnet core and yoke in accordance with the present invention.

A rotor disc 6 is situated in the horizontal air gaps through which the working shunt flux passes and it will be noted that a complete circuit of this shunt flux cuts the rotor only once.

Figures 2, 3:
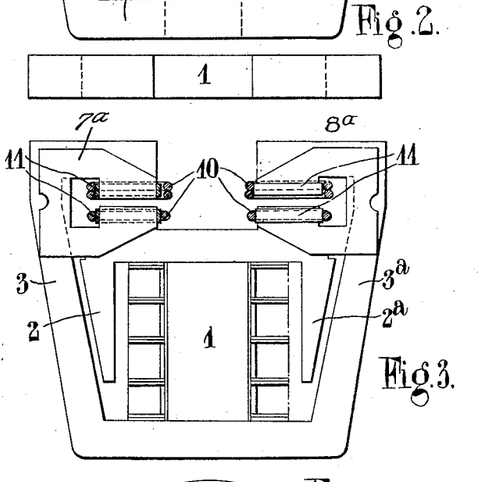
Figure 3 is a similar view to Figure 1 but with series magnet cores and series and shunt coils shown.
Figure 4:
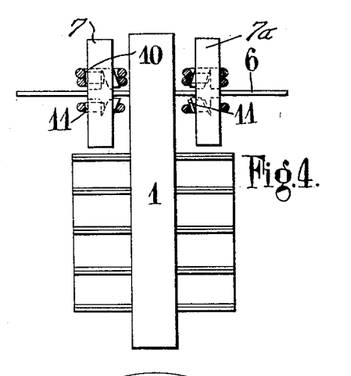
Figure 4 is an elevational view taken at right angles to that represented in Figure 3 with rotor disc in position.
Figure 5:
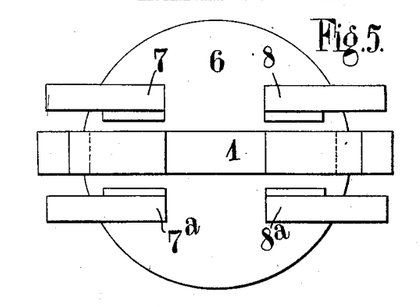
Figure 5 is a plan view corresponding to Figure 4.

I provide four series electromagnet cores 7, 7$^a$ and 8, 8$^a$, Figures 3, 4, 5, these being placed one on either side of each shunt pole so that the interaction of the shunt and series fluxes can produce the necessary drive on the rotor, the driven part of which moves through the horizontal air gaps. In this way there is a complete driving system acting at each of two diametrically opposite points of the circular rotor and so constituting a simple couple or in other words providing a balanced torque. The series elements each comprise a C-shaped core both of whose pole pieces are bifurcated and encircled by series wings 10, Figure 4, the latter being wound preferably in close proximity to the pole faces. One of each pair of the eight pairs of pole pieces formed by the aforementioned bifurcation is encircled by a short circuit coil 11, Figures 3 and 4, in order to produce the well-known "shaded" pole effect, the pole piece portions being suitably splayed to accommodate such coils. The additional torque resulting from these shaded poles serves to compensate the braking effect of the series field which effect otherwise would vary with varying load. It is important to observe at this point that by virtue of this balanced torque the rotor pivot is not subject to any lateral movement but to a pure rotary motion only, thus reducing the rate of wear of the rotor bearing.

Figure 6:
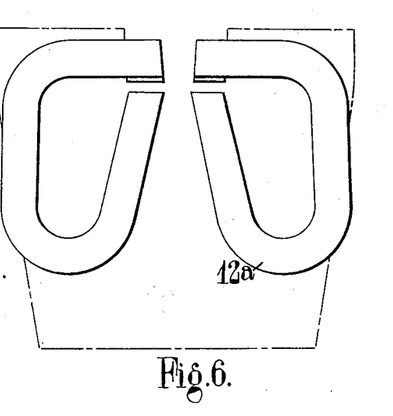
Figures 6 and 7 illustrate side elevational and plan views respectively of a convenient arrangement of braking magnets.
Figure 7:
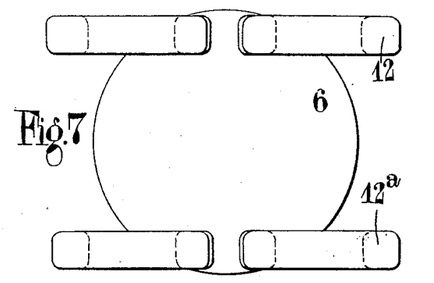

Similarly four braking magnets 12 and 12$^a$, Figures 6 and 7, provide a balanced retarding torque by being arranged to act at diametrically opposite points of the rotor on a diameter at right angles to the one upon which the shunt magnet pole pieces operate.

The depending tapering pieces 2, 2$^a$ at the extremities of the shunt core cross piece may be dispensed with in some cases.

In order to permit of the use of a metal of high conductivity, such as copper, in the construction of the rotor and so secure the consequent advantage of increased torque, the pressure of the rotor on its bearing is reduced in accordance with the present invention. Conveniently this is achieved by providing the rotor spindle 13, Figure 8, with a detachable buoyancy member formed as a float 14 which normally rests beneath and in contact with a fixed boss 15 or shoulder on the spindle by immersing this float in mercury. The centre part of the rotor element is formed as an inverted cylindrical cup 16 closed at its upper end and permanently attached to a spherically or conically faced collar 17 fixed to the spindle 13. The cup is open at its lower end where it is attached to the periphery of a central hole in the rotor disc proper.

Figure 8:
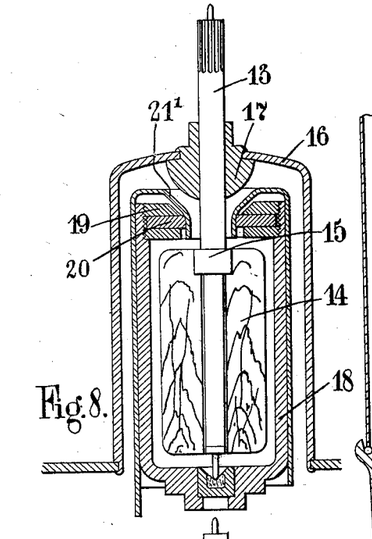
Figure 8 is a vertical cross sectional view of a convenient construction of rotor with buoyancy member.

The mercury chamber is formed as a further cup 18 whose upper end is furnished with a cap 19 embodying a gland 20. This gland coacts with a depending cylindrical portion formed on a third cup 21 concentric with the mercury chamber. This cylindrical portion of the third cup loosely encircles the rotor spindle and causes the third cup when moved vertically upwards to raise the rotor spindle off its lower bearing and lock it in position for safe transit and at the same time to seal the mercury chamber for safe transit by causing a conical surface 21' on the cylindrical portion to engage the spherically or conically faced collar 17 on the rotor spindle.

Figure 9:
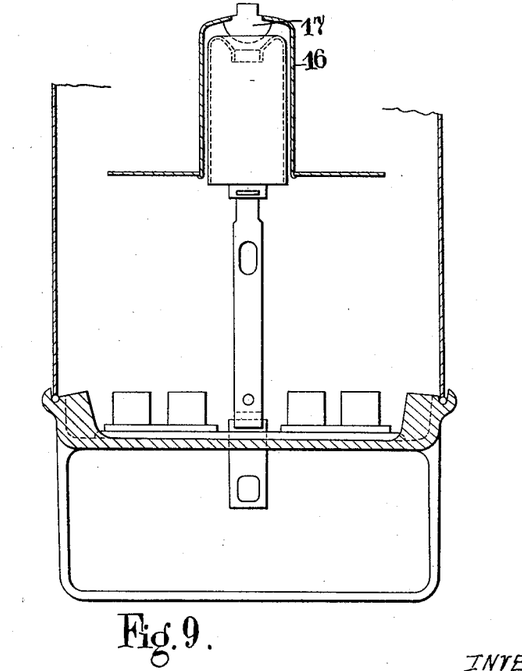
Figures 9 and 10 are elevational views of part of a meter illustrating the rotor and buoyancy chamber of Figure 8 together with means for actuating the spindle locking and sealing device.
Figure 10:
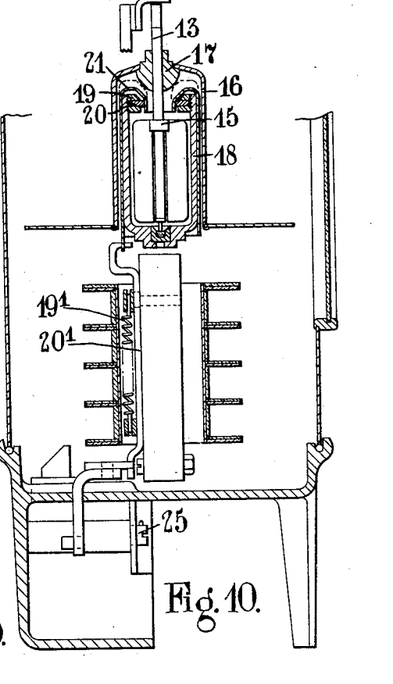

This vertical movement, in order to lock or release the rotor, is executed in the usual manner by aid of an eccentric screw 25, Figures 9 and 10, or other convenient means, but the operating link 20' and return spring 19' are housed within the shunt magnet bobbin thus providing a very compact and convenient arrangement.

Figure 15:
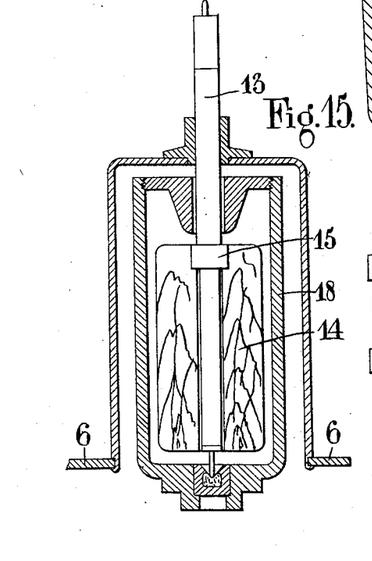
Figure 15 represents an alternative means of avoiding the spilling of mercury during transit of a meter.

Prevention of leakage of mercury from the mercury chamber may, however, be effected by other convenient means, e. g. by providing the chamber with a depending central tubular portion similar to that often employed in unspillable inkwells, Figure 15.

Figure 11:
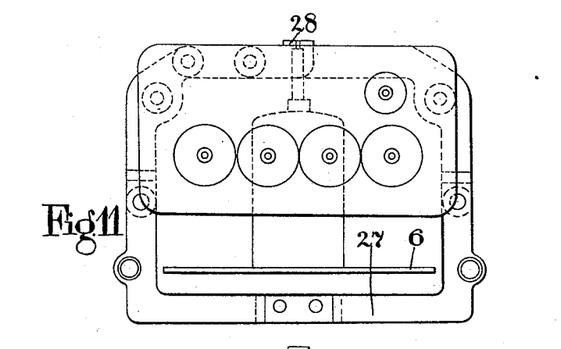
Figures 11 and 12 are elevational views of a detachable unit embodying a supporting frame, rotor spindle bearings and counter mechanism.
Figure 12:
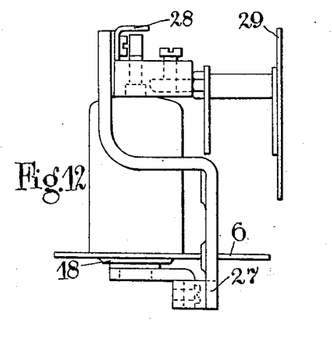

The mercury chamber 18, Figures 11 and 12, in which the lower spindle bearing is incorporated, is supported in a frame 27 which also carries the upper spindle bearing 28 to which the counter mechanism 29 of the meter is attached. The unit so formed may thus be detached intact without first removing any of its constituents, it being, however, necessary first to remove one of the pairs of braking magnets.

Figure 13:
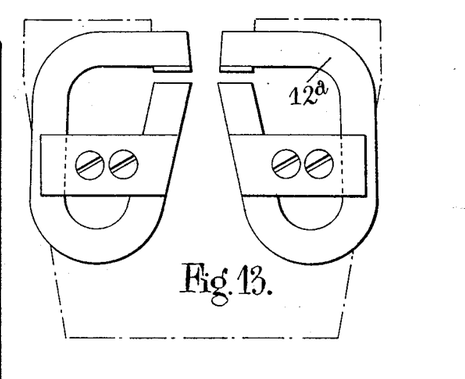
Figures 13 and 14 represent in elevation and plan respectively a convenient form of and means for hinging a pair of the braking magnets.
Figure 14:
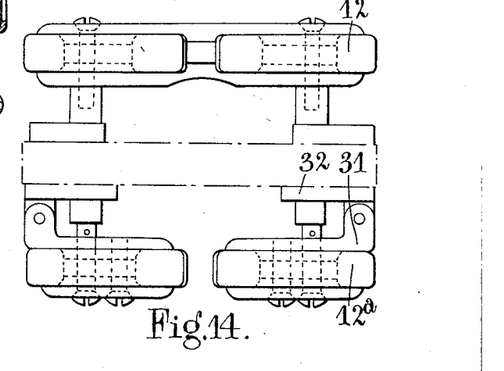

In order to facilitate this last-mentioned operation, I mount one pair of the braking magnets 12ª, Figures 13 and 14, on non-magnetic frames 31 which are hinged at one end to the main frame 32 of the meter thus enabling these magnets to be swung clear of the rotor when it is desired to remove the rotor.

The rotor may then be detached by releasing the upper spindle bearing 28, Figure 12, and lifting the rotor and spindle vertically upwards, the float, of course, remaining within the mercury chamber.

Figure 16:
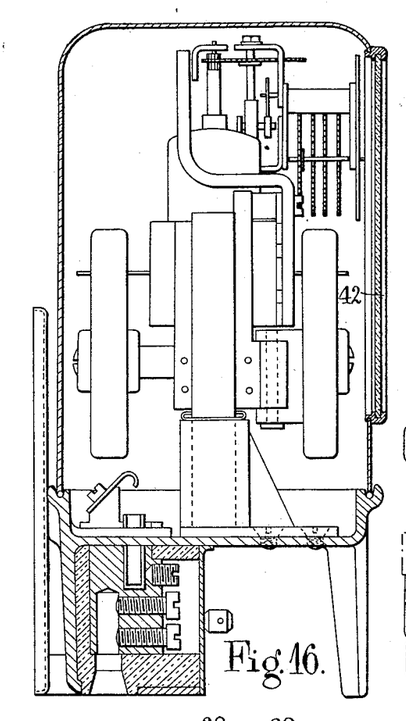
Figures 16 and 17 are sectional and front elevational views respectively of a convenient arrangement of mechanism and casing intended for ready accessibility.
Figure 17:
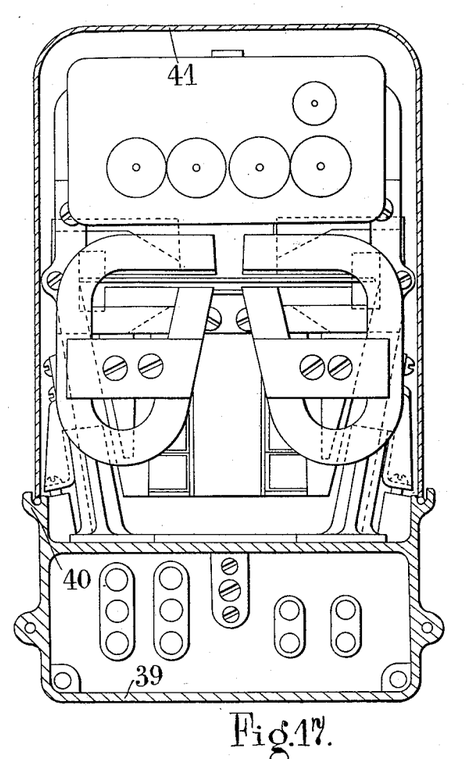

According to a further modification as illustrated in Figures 16 and 17, a unit comprising braking and driving elements, rotor, mercury chamber, counter train and terminal block is adapted to be placed from the top into position within a meter casing 40, a horizontal division between the upper and lower portion of the casing enabling an airtight joint to be made at this point.

Figure 18:
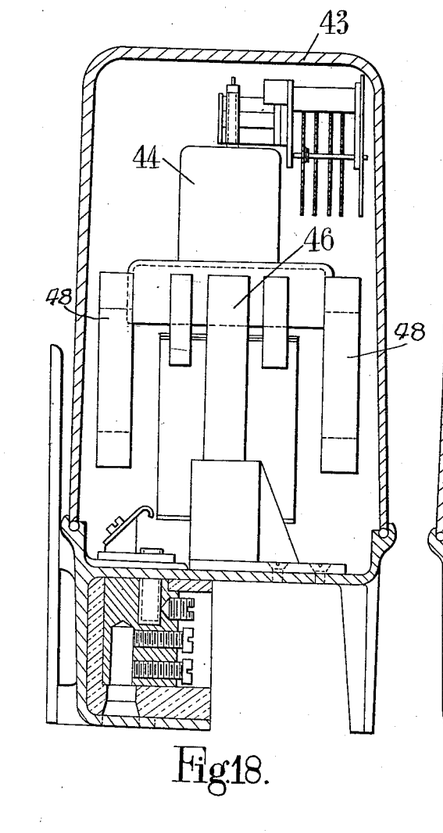
Figures 18 and 19 are equivalent views to Figures 16 and 17 but illustrate a modified arrangement.
Figure 19:
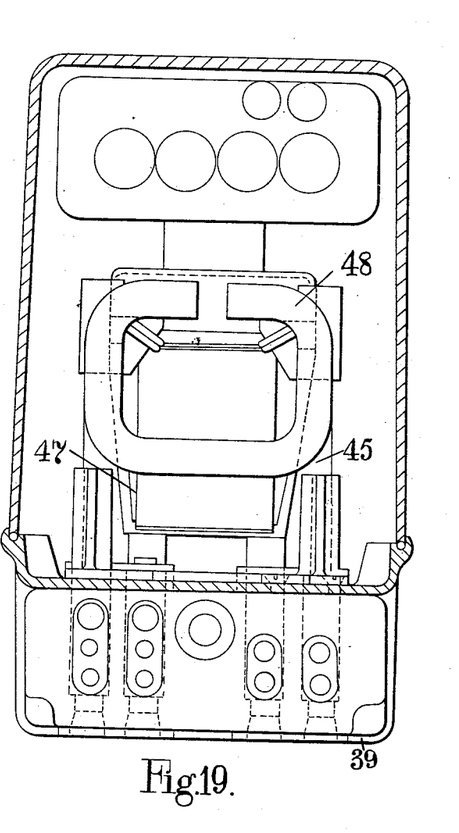

The upper portion may be formed as a bell cover 41 fitted with a glass panel 42, Figure 16, or it may be formed as an all-glass bell, Figures 18 and 19.

According to the further modification illustrated in Figures 18 and 19, the rotor is capable of removal from above without disturbing either the braking or the driving magnets, the rotor being formed as a cylindrical bell 44 whose cylindrical surface operates in a vertical air gap.

In this form, the side limbs of the shunt magnet core 46 rest upright outside the cylindrical portion of the bell and the ends 47 of the cross piece of the central limb terminate adjacent the extremities of these side limbs thus forming vertical air gaps in which the bell revolves.

Two pairs of symmetrically disposed series magnets are provided as before but as regards braking magnets I employ only two permanent magnets 48 of U-shape, the magnets being disposed vertically outside the cylindrical portion of the bell and equidistant between the shunt magnet core pole pieces.

Figure 20:
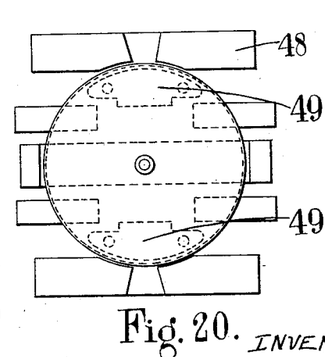
Figure 20 is a plan view of the construction illustrated in Figures 18 and 19.

Adjacent the pole pieces of each permanent magnet but on the opposite side of the cylindrical portion of the bell, I provide a soft iron piece 49, Figure 20, which serves to concentrate the flux and decrease the reluctance of its path.

Figure 21:
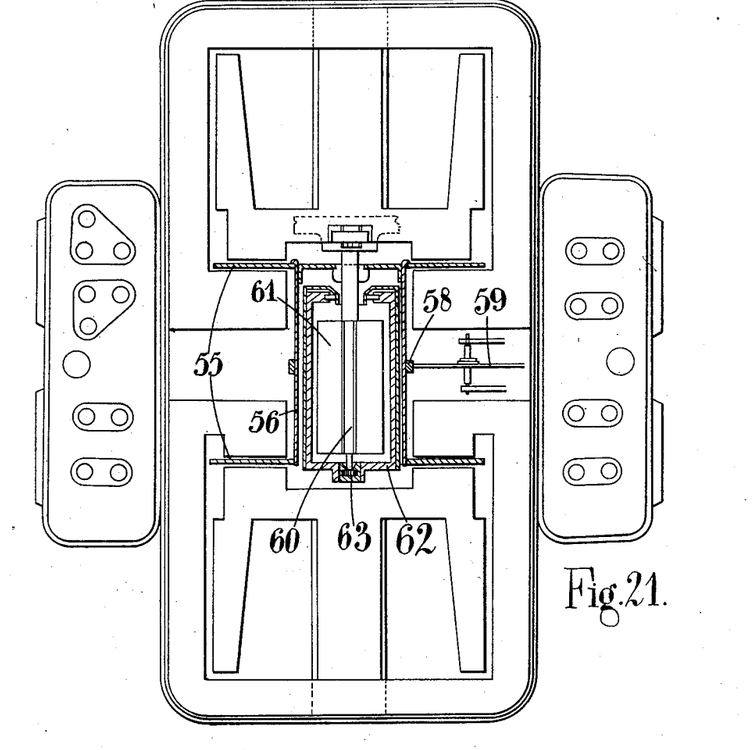
Figure 21 is a vertical sectional view of a modified construction of meter adapted for multi-phase work.

In one example, as applied to a multi-phase meter, I provide two discs 55, Figure 21, coupled together by a cylindrical member 56 which latter bears externally a toothed ring 58 engaging the counter train 59. This double disc and cylinder is mounted on a spindle 60 carrying a float 61 immersed in a mercury chamber 62, the latter having a footstep jewel bearing 63 as before and being adapted to sustain some of the weight of the rotor element. Each disc is situate in the air gap of a shunt coil magnetic system which may be similar to any of those described above, similar series coil magnetic systems also being provided adjacent the shunt core pole pieces.

Figure 22:
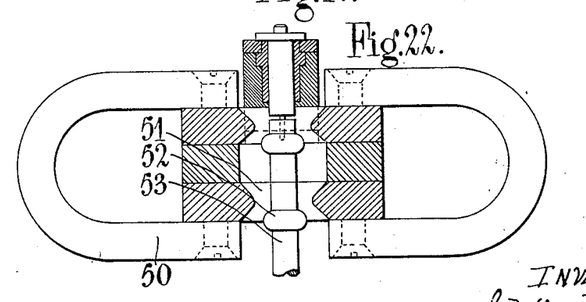
Figures 22 and 23 represent vertical sectional and plan views respectively of a convenient known form of magnetic suspesion which may be incorporated in meters according to the present invention.
Figure 23:
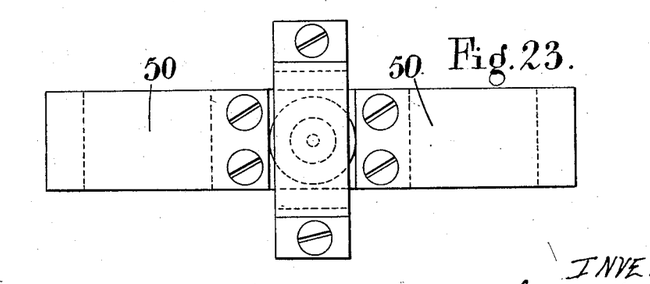

Instead of reducing the pressure on the lower rotor spindle bearing by the adoption of a mercury floated rotor, as described above, this may be effected magnetically provided that this be carried out without thereby introducing appreciable unbalanced lateral force on the spindle bearings. A convenient known form of magnetic suspension comprises two U-shaped permanent magnets 50, Figures 22 and 23, each provided with pointed pole tips 51, the magnets being so mounted that two rings 52 of magnetizable material fitted one above the other on the spindle 53 tend to rise by the magnetic attraction of the pole tips 51 and so relieve the pressure on the lower bearing due to the weight of the rotor.

Other known or convenient forms of magnetic suspension may be employed if desired.

In constructions of meters in accordance with the present invention any number of permanent braking magnets may be employed provided their poles be so disposed in relation to the rotor or rotors that a balanced retarding torque is applied to the rotor spindle.

Having now described my invention what I claim as new and desire to secure by Letters Patent is:—

1. An induction electricity meter of the type set forth including a rotor, and a buoyancy chamber associated therewith, said rotor and said chamber being mounted in a removable frame which can be withdrawn as a unit while maintaining the relative positions of chamber, rotor and frame.

2. An induction electricity meter of the type set forth, including a rotor, balanced torque driving and braking means associated therewith, and buoyant means substantially free of braking drag associated with the rotor, serving to relieve stresses due to gravity, and a sealing device for the chamber enclosing said buoyant means, said sealing device being so arranged as to secure the rotor for safe transport.

3. An induction electricity meter of the type set forth including a cylindrical bell rotor, balanced torque driving means, balanced torque braking means and means for relieving force due to gravity applied to the supporting means of the rotor, said driving, braking and force-relieving means being disposed to permit removal of the rotor from above with maintenance in position of said means.

In testimony wherof I have signed my name to this specification.

SEBASTIAN ZIANI DE FERRANTI.